J. Avery, Jr.,

Steam Tran,

No. 4847

Reissued April 2, 1872.

UNITED STATES PATENT OFFICE.

GEORGE DOYLE, OF BARRE, MASS., ASSIGNEE OF JOHN AVERY, JR.

IMPROVEMENT IN STEAM-TRAPS.

Specification forming part of Letters Patent No. 27,769, dated April 10, 1860; reissue No. 4,847, dated April 2, 1872.

*To all whom it may concern:*

Be it known that JOHN AVERY, Jr., of the city of New York, in the county and State of New York, did invent a new and Improved Steam-Trap Valve; and I, GEORGE DOYLE, of Barre, in the county of Worcester and State of Massachusetts, assignee of said JOHN AVERY, Jr., do hereby declare that the following is a full, clear, and exact description thereof, which will enable others skilled in the art to make and use the same, reference being had to the accompanying drawing forming part of this specification.

Figure 2:
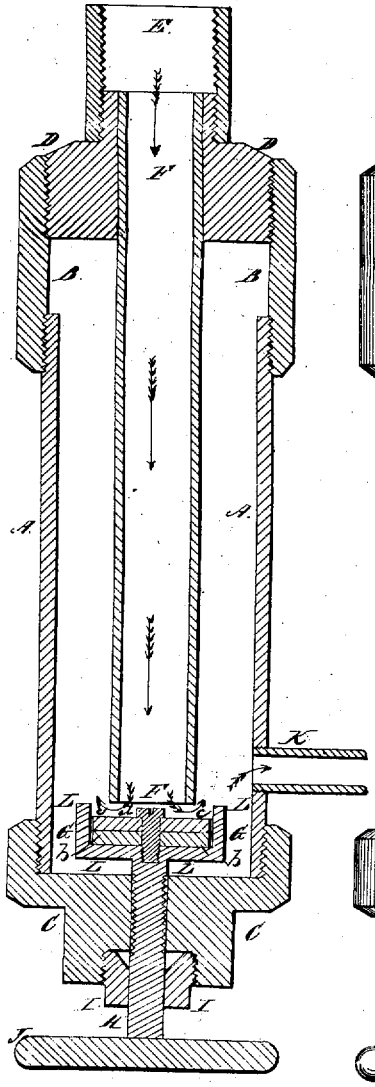
Figure 1:
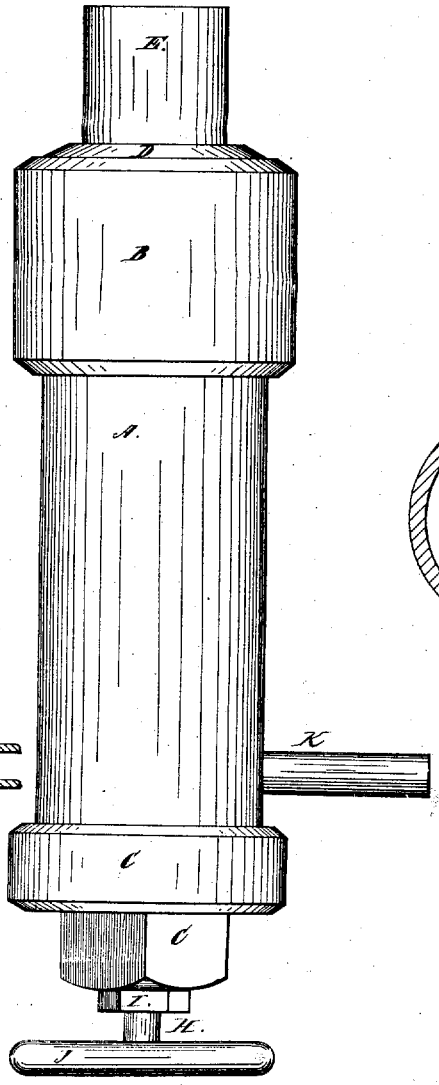
Figure 3:
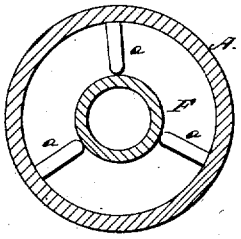

Figure 1 represents a view of the entire apparatus. Fig. 2 represents a vertical central section through the same. Fig. 3 represents a transverse section thereof.

Similar letters of reference, where they occur in the several figures, denote like parts of the apparatus in all of them.

I am aware that "steam-traps," as they are termed, are well known, and that the expansion and contraction of tubes and bars under different degrees of temperature, and of metals more or less sensitive thereto, have been used for opening and closing passages. These things I do not claim, independent of my particular construction and arrangement of condensing chambers and valve to effect the purpose.

My invention consists in the combination of an expansive tube, an elastic or adjustable seat, and a condensing-chamber, for the purposes herein set forth.

To enable others skilled in the art to make and use my invention, I will proceed to describe the same with reference to the drawing.

A represents an outer case or cylinder, upon one end of which is fitted a sleeve, B, and the other end a head, C, and these parts may be iron. Into the end of the sleeve B is screwed or otherwise fastened a nut, D, to which a steam-pipe, E, may, in turn, be secured, said steam-pipe communicating with or being a part of the pipe or series of pipes to be freed of the water of condensation. To the nut D is secured one end of the pipe F, which extends through the interior of the case or cylinder A; the other end of said pipe being left free, as shown in the drawing, Fig. 2. Guides *a a a* may be arranged in the case to keep the tube or pipe F in proper position. This tube or pipe F should be made of some metal, or of an alloy or mixture of metals, that will expand and contract more, under the same temperature, than the iron will—as, for instance, copper, brass, zinc, &c. G is a cup-shaped piece arranged inside of the case or cylinder A, and near to the free end of the tube F. This cup is attached to the end of a screw-rod, H, that passes through the head C, said rod being packed, as at I, and having upon its outer end a hand-wheel, J, or other device, by which the screw-rod may be turned to move the cup nearer to or further from the free end of the pipe F. In this cup G may be placed a rubber or other elastic disk or ring, *b*, and over it a plate, *c*, both of which are confined to the cup by a screw-rod, *d*, or otherwise, so that the plate may yield on the elastic bearing beneath it, but not drop off its seat. This plate *c*, as well as the end of the pipe F that closes against it, should have well finished or ground surfaces, to make a tight joint. The escape-pipe K is located somewhat above the free end of the pipe, so as to form between it and the head C that closes against the end of the cylinder a condensing-chamber, L, for holding the water of condensation, and the valve composed of the cup, and the plate and yielding disk or ring *b*, when used, are also placed in this condensing-chamber.

Though I have shown simply a rubber disk for producing the yielding property to the plate or valve, a metal spring may be substituted for the rubber. The rubber, however, is cheap and effective, and serves the purpose of allowing the valve to yield when the pressure upon it is greater than that for which it has been set by the screw-rod H, and it is intended to compensate for any excessive elongation of the tube F, without disarranging any of the parts.

The operation of this apparatus is obvious. When the pipes and cylinder are cold the contraction of the one F causes its free end to leave the valve *c*, and thus an opening is formed, and the water, as shown by the arrows, runs out of it into the chamber L, and thence out of the waste-pipe K. When steam is let into the pipe F, or it becomes heated, it expands until it closes its free end against the cup G or valve *c*, and thus remains tight so long as the heat remains in it, and its excessive elongation beyond an adjustable point is taken up by the compression of the spring or cushion under said valve, and prevents any breakage.

The apparatus is simple, and may be placed anywhere in connection with steam-pipes, and it will free said pipes of all water of condensation in them whenever the fires are allowed to go down.

Having thus described my invention, what I claim as new, and desire to secure by Letters Patent, is—

The combination of the adjustable-seat G, with the expansible tube F, or its equivalent, condensing-chamber L, and case or cylinder A, substantially as herein shown and described, and for the purpose set forth.

GEORGE DOYLE.

Witnesses:
ORAMEL CLARK,
E. D. BLAKELY.